(12) United States Patent
Wakimura et al.

(10) Patent No.: US 10,823,639 B2
(45) Date of Patent: Nov. 3, 2020

(54) MISFIRE DETECTION DEVICE AND VEHICLE

(71) Applicants: YAMAHA HATSUDOKI KABUSHIKI KAISHA, Iwata-shi, Shizuoka (JP); DENSO CORPORATION, Kariya-shi, Aichi (JP)

(72) Inventors: Makoto Wakimura, Iwata (JP); Kazuteru Iwamoto, Iwata (JP); Yoh Aramaki, Iwata (JP); Shunichi Akama, Iwata (JP); Minoru Hotta, Kariya (JP); Yoshihiko Nonogaki, Kariya (JP)

(73) Assignees: YAMAHA HATSUDOKI KABUSHIKI KAISHA, Iwata-shi, Shizuoka (JP); DENSO CORPORATION, Kariya-shi, Aichi (JP)

( * ) Notice: Subject to any disclaimer, the term of this patent is extended or adjusted under 35 U.S.C. 154(b) by 148 days.

(21) Appl. No.: 16/206,139

(22) Filed: Nov. 30, 2018

(65) Prior Publication Data

US 2019/0101472 A1 Apr. 4, 2019

Related U.S. Application Data

(63) Continuation-in-part of application No. PCT/JP2017/017727, filed on May 10, 2017.

(30) Foreign Application Priority Data

May 31, 2016 (JP) ................. 2016-108482

(51) Int. Cl.
*G01M 15/11* (2006.01)
*F02B 67/06* (2006.01)
(Continued)

(52) U.S. Cl.
CPC .............. *G01M 15/11* (2013.01); *B62J 99/00* (2013.01); *F02B 61/02* (2013.01); *F02B 67/06* (2013.01);
(Continued)

(58) Field of Classification Search
CPC ......... G01M 15/11; F02B 67/06; F02B 61/02; F16H 7/06; F16H 7/02; F02D 45/00; F02D 41/1497; B62J 99/00; Y02T 10/47
See application file for complete search history.

(56) References Cited

U.S. PATENT DOCUMENTS

| | | | |
|---|---|---|---|
| 5,507,180 A | 4/1996 | Tomisawa | |
| 5,951,617 A | 9/1999 | Shinohara et al. | |
| 6,799,453 B2 | 10/2004 | Miyauchi et al. | |
| 8,261,603 B2 * | 9/2012 | Kondo | F02D 41/1498 73/114.03 |
| 9,031,815 B2 * | 5/2015 | Caterini | G01M 15/11 702/182 |

(Continued)

FOREIGN PATENT DOCUMENTS

| | | |
|---|---|---|
| JP | H04-365958 A | 12/1992 |
| JP | H08-61131 A | 3/1996 |

(Continued)

*Primary Examiner* — Freddie Kirkland, III
(74) *Attorney, Agent, or Firm* — Rabin & Berdo, P.C.

(57) ABSTRACT

An object is to provide a misfire detection device and a vehicle with an enhanced detection reliability. A misfire detection device includes: a rotation speed acquisition unit configured to acquire a rotation speed of a rotator rotated by a four-stroke engine; a misfire determination unit configured to determine the presence or absence of a misfire in the four-stroke engine based on the rotation speed of the rotator acquired by the rotation speed acquisition unit; and a periodic fluctuation detection unit configured to detect a periodic fluctuation contained in a rotation fluctuation of the four-stroke engine based on a rotation speed acquired by the rotation speed acquisition unit, the periodic fluctuation being repeated on a circulation cycle of at least one element of a wrapping transmission element or a plurality of transmission wheels, the periodic fluctuation having a plurality of (Continued)

extreme values within the circulation cycle of the one element.

9 Claims, 8 Drawing Sheets

(51) Int. Cl.
*F16H 7/06* (2006.01)
*F02D 45/00* (2006.01)
*F02B 61/02* (2006.01)
*B62J 99/00* (2020.01)
*F16H 7/02* (2006.01)
*F02D 41/14* (2006.01)

(52) U.S. Cl.
CPC ......... *F02D 41/1497* (2013.01); *F02D 45/00* (2013.01); *F16H 7/02* (2013.01); *F16H 7/06* (2013.01); *Y02T 10/40* (2013.01)

(56) References Cited

U.S. PATENT DOCUMENTS

| | | | |
|---|---|---|---|
| 10,281,359 B2* | 5/2019 | Jino | F02D 41/1497 |
| 10,408,151 B2* | 9/2019 | Hotta | F02D 45/00 |
| 10,527,522 B2* | 1/2020 | Jino | G01M 15/11 |
| 2003/0163242 A1* | 8/2003 | Miyauchi | F02D 41/1498 |
| | | | 701/111 |
| 2010/0031736 A1 | 2/2010 | Kushihama et al. | |
| 2010/0294027 A1* | 11/2010 | Kondo | G01M 15/11 |
| | | | 73/114.02 |
| 2018/0087462 A1* | 3/2018 | Hotta | F02D 41/1498 |

FOREIGN PATENT DOCUMENTS

| | | |
|---|---|---|
| JP | H10-110649 A | 4/1998 |
| JP | 2010-024850 A | 2/2010 |
| JP | 2014-199040 A | 10/2014 |

\* cited by examiner

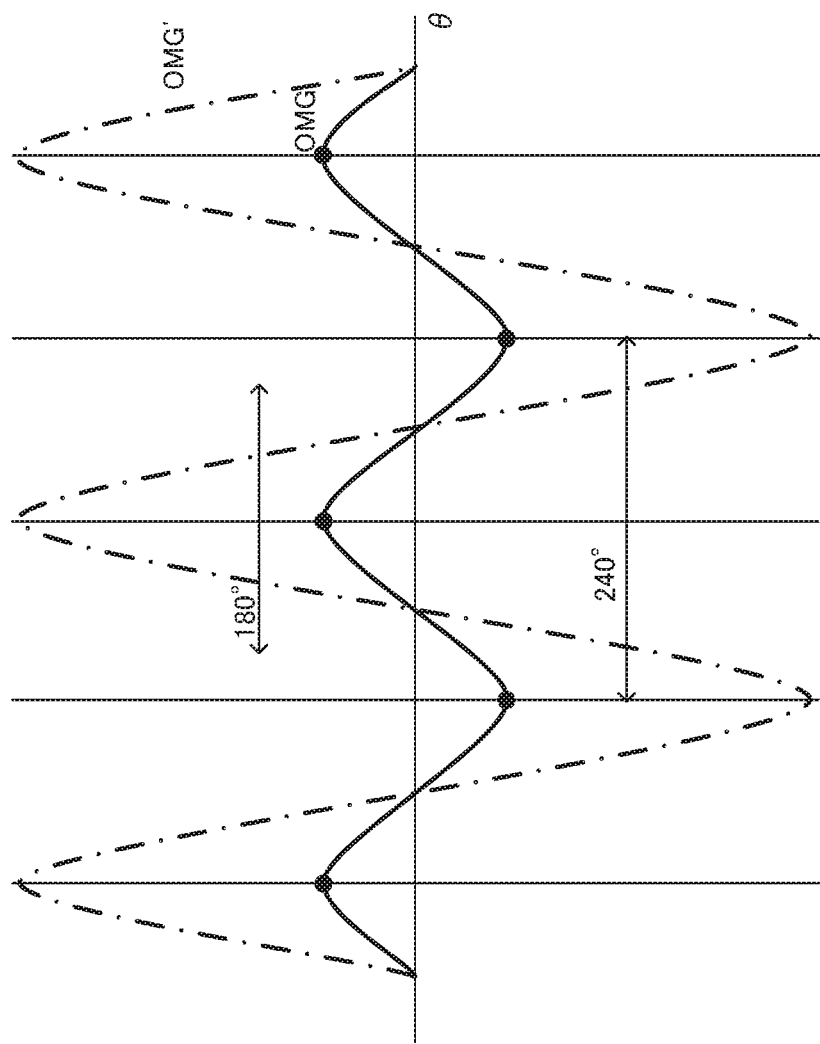

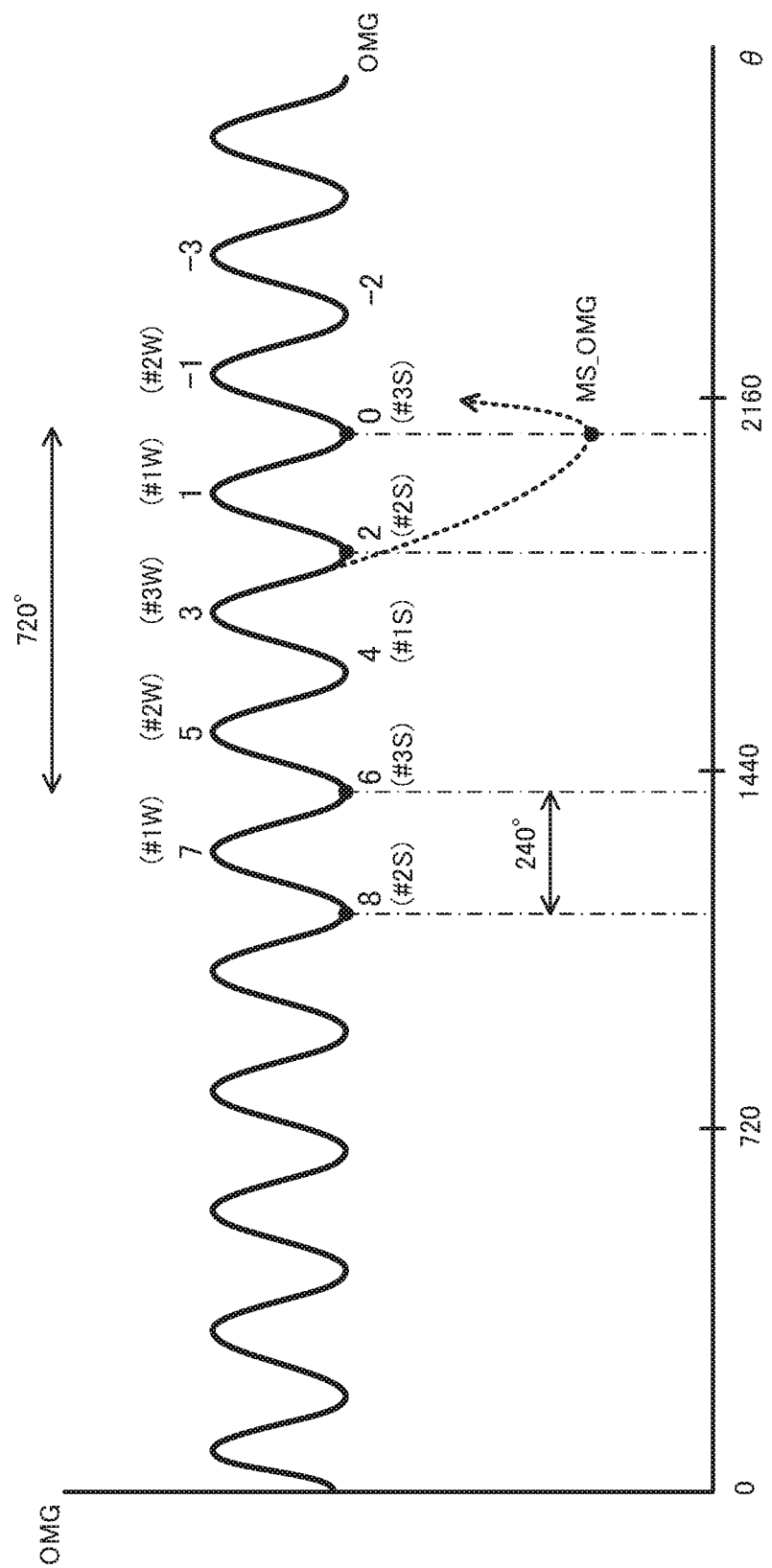

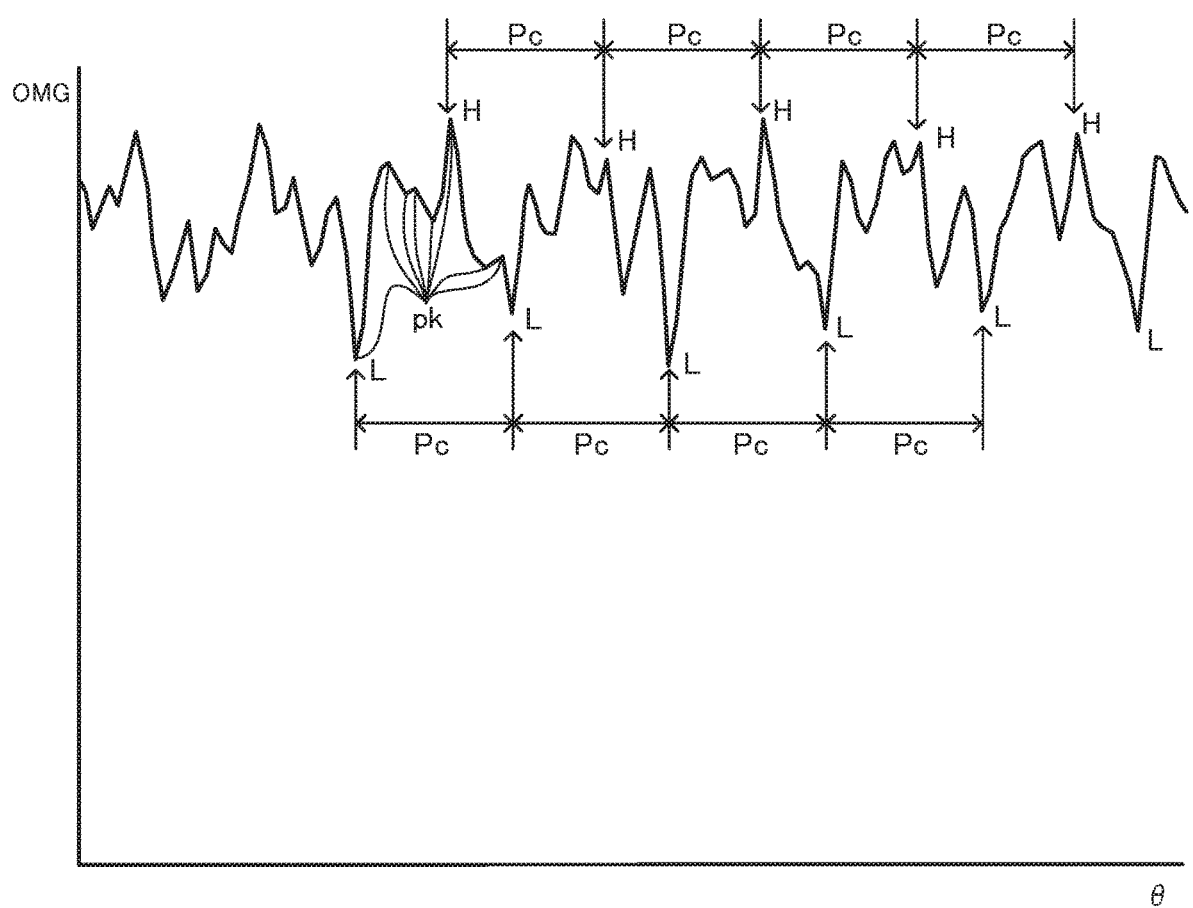

MISFIRE DETECTION DEVICE AND VEHICLE

CROSS-REFERENCE TO RELATED APPLICATIONS

This is a continuation-in-part application of International Application PCT/JP2017/017727, filed on May 10, 2017, which is based on, and claims priority to, Japanese Patent Application No. 2016-108482, filed on May 31, 2016. The contents of each of the identified applications is fully incorporated herein by reference.

BACKGROUND

Technical Field

The present teaching relates to a misfire detection device that detects a misfire in a four-stroke engine, and to a vehicle.

Background Art

One example of a conventional misfire detection device for detecting a misfire in a four-stroke engine is a misfire detection device for internal combustion engine disclosed in Patent Literature 1 (PTL 1) (identified further on). The misfire detection device for internal combustion engine obtains an average rotational frequency on in an explosion stroke for each cylinder based on an output of a rotation angle sensor. Then, the misfire detection device obtains a deviation (first fluctuation amount ($\omega_{n-1} - \omega_n$)) between average rotational frequencies $\omega_n$ for cylinders whose explosion strokes are successive, and a deviation (second fluctuation amount ($\omega_{n-4} - \omega_{n-3}$)) between average rotational frequencies for successive cylinders at rotation angle positions 360° CA (crank angle) before positions at the first fluctuation amount, to set an average rotational frequency fluctuation amount $\Delta\omega_n$. Then, the misfire detection device identifies a misfire based on the average rotational frequency fluctuation amount $\Delta\omega_n$.

CITATION LIST

Patent Literature

PTL 1: Japanese Patent Application Laid-Open No. H4-365958 (1992)

A four-stroke engine for which a detection is to be performed as disclosed in PTL 1 is, in some cases, configured to drive a wrapping transmission element that is wrapped around a plurality of transmission wheels. For example, the four-stroke engine may be mounted to a vehicle which travels with a driving force transmitted from the wrapping transmission element.

In a case where, for example, a four-stroke engine for which a misfire is to be detected is mounted to a vehicle including a wrapping transmission element, it may be difficult for the conventional misfire detection device as disclosed in PTL 1 to appropriately identify a misfire even when the vehicle is traveling, not on a rough road, but on a flat road. In addition, the conventional misfire detection device as disclosed in PTL 1, which faces difficulties in appropriately identifying a misfire, may conclude that the difficulties in identifying a misfire are because of a rough road, even when traveling on a flat road.

Consequently, the conventional misfire detection device may be less reliable in terms of misfire detection, depending on an apparatus (e.g., a vehicle) to which the four-stroke engine is mounted. It has been demanded that a detection reliability of the misfire detection device be enhanced.

SUMMARY

An object of the present teaching is to provide a misfire detection device with an enhanced detection reliability, and a vehicle equipped with the misfire detection device.

To solve the problems described above, the present teaching adopts the following configurations.

(1) A misfire detection device for detecting a misfire in a four-stroke engine that drives a wrapping transmission element wrapped around a plurality of transmission wheels so as to move circularly, the misfire detection device including:

a rotation speed acquisition unit configured to acquire a rotation speed of a rotator rotated by the four-stroke engine;

a misfire determination unit configured to determine the presence or absence of a misfire in the four-stroke engine based on a rotation speed of the rotator acquired by the rotation speed acquisition unit; and a periodic fluctuation detection unit configured to detect a periodic fluctuation contained in a rotation fluctuation of the four-stroke engine based on a rotation speed acquired by the rotation speed acquisition unit, the periodic fluctuation being repeated on a circulation cycle of at least one element of the wrapping transmission element or the plurality of transmission wheels, the periodic fluctuation having a plurality of extreme values within the circulation cycle of the one element.

The misfire detection device of (1) determines the presence or absence of a misfire based on a rotation speed of the rotator rotated by the four-stroke engine, and detects a periodic fluctuation that is repeated on a circulation cycle of at least one element of the wrapping transmission element or the plurality of transmission wheels, the periodic fluctuation having a plurality of extreme values within the circulation cycle of the one element. The periodic fluctuation may sometimes influence the determination of the presence or absence of a misfire. A detection result about the periodic fluctuation obtained by the periodic fluctuation detection unit can be used as an index indicative of whether or not the determination of the presence or absence of a misfire is under the influence. It therefore is possible to determine whether or not the one element influences the determination of the presence or absence of a misfire. That is, a case where the determination of the presence or absence of a misfire has a high validity and a case where it has a low validity are distinguished from each other. As a result, the misfire detection performed by the misfire detection device has an enhanced reliability.

The inventors of the present teaching conducted studies on the problems described above, to find out the following.

A rotation fluctuation of the four-stroke engine provided in an apparatus (such as a vehicle) contains, for example, a fluctuation not associated with a crank angular velocity of the engine and a fluctuation associated with the crank angular velocity of the engine. Examples of the fluctuation not associated with the crank angular velocity of the engine include acceleration or deceleration of the four-stroke engine caused by an operation performed on the apparatus, a change in the rotation speed of the four-stroke engine caused by a change in an external load applied to the apparatus, and the like. The change in the external load applied to the apparatus includes, for example, a change in a load applied to the four-stroke engine of the vehicle at a time of rough road traveling. Examples of the fluctuation associated with the crank angular velocity of the engine include a combustion irregularity, a cylinder deviation, a tolerance of a crank angular velocity sensor or of a detection object part to be detected by the sensor, and the like.

A rotation speed of the four-stroke engine detected by the crank angular velocity sensor usually contains a rotation fluctuation caused by various factors mentioned above. The conventional misfire detection device as disclosed in PTL 1 can reduce an influence of the rotation fluctuation caused by these factors, for diagnosis such as identification of the presence or absence of a misfire.

Depending on an apparatus in which the four-stroke engine is provided, however, a fluctuation other than the above-mentioned fluctuation may occur as the fluctuation associated with the crank angular velocity of the engine. In a vehicle, for example, not only a fluctuation attributable to engine internal factors such as a combustion irregularity, a cylinder deviation, and a tolerance of a crank angular velocity sensor or of a detection object part to be detected by the sensor but also a fluctuation attributable to engine external factors may occur as the fluctuation associated with the crank angular velocity of the engine. This is why application of the conventional control device may be sometimes difficult depending on an apparatus (such as a vehicle) in which the four-stroke engine is provided.

The inventors of the present teaching conducted studies on a fluctuation attributable to engine external factors. The inventors of the present teaching discovered that a rotation speed fluctuation of a four-stroke engine that drives a wrapping transmission element sometimes contains a fluctuation caused by at least one element of the wrapping transmission element or a plurality of transmission wheels. The inventors of the present teaching further discovered that it is difficult for the conventional misfire detection device to identify a misfire in a four-stroke engine in spite of not traveling on a rough road, because a rotation fluctuation of the four-stroke engine contains a fluctuation caused by at least one element of a wrapping transmission element or a plurality of transmission wheels. In addition, the inventors of the present teaching discovered that the fluctuation attributable to the wrapping transmission element or the like has a periodicity corresponding to a circulation cycle of the wrapping transmission element or the like, and its influence on the determination of the presence or absence of a misfire is more constant than a fluctuation attributable to, for example, a temporary state of a road surface on which the vehicle travels.

The present teaching is an invention accomplished based on the discoveries above.

The misfire detection device of the present teaching detects a periodic fluctuation in the rotation speed of the four-stroke engine, the periodic fluctuation being repeated on a circulation cycle of at least one element of a wrapping transmission element or a plurality of transmission wheels. Thus, for example, a state where misfire detection is difficult due to at least one element of the wrapping transmission element or the plurality of transmission wheels can be detected. This can reduce occurrence of a situation in which the state where misfire detection is difficult due to the element is erroneously recognized as being a temporary failure of misfire detection due to rough road traveling, for example. Accordingly, a detection reliability can be enhanced.

The misfire detection device of the present teaching may not necessarily be configured to detect only a periodic fluctuation repeated on a circulation cycle of at least one element of the wrapping transmission element or the plurality of transmission wheels and a misfire in the four-stroke engine.

The misfire detection device of the present teaching may be configured to, for example, detect a fluctuation that is contained in a rotation fluctuation of the four-stroke engine and that is other than the periodic fluctuation repeated on the circulation cycle of the one element. The misfire detection device may be configured to, for example, detect a smooth undulation that fluctuates with a period other than the periodic fluctuation, or a fluctuation involved in acceleration or deceleration.

In the misfire detection device of the present teaching, the determination of the presence or absence of a misfire in the four-stroke engine is performed based on a rotation speed of the rotator rotated by the four-stroke engine. The determination of the presence or absence of a misfire in the four-stroke engine is not performed based on a pressure of the four-stroke engine. The determination of the presence or absence of a misfire in the four-stroke engine is not performed based on a temperature of the four-stroke engine. The determination of the presence or absence of a misfire in the four-stroke engine may be performed based only on a rotation speed of the rotator rotated by the four-stroke engine, as illustrated in a later-described embodiment.

In the misfire detection device of the present teaching, the misfire determination unit determines the presence or absence of a misfire based on, for example, a rotation speed fluctuation amount of the rotator. The misfire determination unit determines the presence or absence of a misfire based on, for example, a change in the rotation speed fluctuation amount after elapse of a predetermined crank angle section. Here, the misfire determination unit may, for example, not rely on a change in the fluctuation amount after elapse of the predetermined crank angle section, for determining the presence or absence of a misfire. The misfire determination unit may, for example, not rely on the rotation speed fluctuation amount of the rotator, for determining the presence or absence of a misfire.

The periodic fluctuation detection unit detects a periodic fluctuation including a sharp fluctuation. The periodic fluctuation detected by the periodic fluctuation detection unit may be a smooth fluctuation, however. The periodic fluctuation has a plurality of extreme values within a circulation cycle of at least one element of the wrapping transmission element or the plurality of transmission wheels. The plurality of extreme values may appear at random intervals or at equal intervals within one circulation cycle.

The plurality of extreme values include a local maximum value or a local minimum value. The local maximum value is a rotation speed value at a position where the rotation speed of the rotator switches from increasing to decreasing when viewed in the order of acquisition. The local minimum value is a rotation speed value at a position where the rotation speed of the rotator switches from decreasing to increasing when viewed in the order of acquisition.

For example, in a case where the periodic fluctuation detection unit detects a periodic fluctuation based on a rotation speed averaged over a section wider than the interval of rotation speed acquisition timings, the extreme value is determined based on each averaged rotation speed. For example, in a case where the periodic fluctuation detection unit detects a periodic fluctuation in a rotation speed that is culled from rotation speeds acquired by the rotation speed acquisition unit, the extreme value is determined based on the culled rotation speed.

The periodic fluctuation detection unit detects a periodic fluctuation, at least when the amplitude of a periodic fluctuation repeated on a circulation cycle of at least one element of the wrapping transmission element or the plurality of transmission wheels is larger than the amplitude of a fluctuation involved in a combustion operation of the four-stroke engine. Alternatively, the periodic fluctuation detection unit may detect a periodic fluctuation when the amplitude of the periodic fluctuation is smaller than the amplitude of the fluctuation involved in the combustion operation.

In the misfire detection device of the present teaching, a periodic fluctuation repeated on a circulation cycle of at least one element of the wrapping transmission element or the plurality of transmission wheels is detected based on a rotation speed of the rotator rotated by the four-stroke engine. The detection of the periodic fluctuation is not performed based on an accelerator sensor provided to the wrapping transmission element or the transmission wheel. The detection of the periodic fluctuation repeated on the circulation cycle of at least one element of the wrapping transmission element or the plurality of transmission wheels may be performed based only on the rotation speed of the rotator rotated by the four-stroke engine, as illustrated in the later-described embodiment.

In the misfire detection device of the present teaching, the rotation speed acquisition unit acquires a rotation speed of the rotator rotated by the four-stroke engine by using, for example, the crank angle as a reference of an acquisition timing. The periodic fluctuation detection unit detects a periodic fluctuation based on, for example, a rotation speed that the rotation speed acquisition unit acquires by using the crank angle as a reference. Alternatively, the rotation speed acquisition unit may acquire a rotation speed by using, for example, elapse of a certain fixed time as a reference of the acquisition timing. Alternatively, the periodic fluctuation detection unit may detect a periodic fluctuation based on, for example, a rotation speed that is acquired by using elapse of a certain fixed time as a reference.

The misfire detection device may include a combustion control unit that controls operations of the four-stroke engine, for example. The misfire detection device, however, may be a device separate from a device that controls engine operations.

For example, the misfire detection device further includes a misfire announcing unit configured to output, to outside of the misfire detection device, information indicating a determination result about the presence or absence of a misfire obtained by the misfire determination unit. The misfire detection device not outputting detection information to the outside of the misfire detection device is also acceptable, however. For example, the misfire detection device may provide its determination result for use by another function of the misfire detection device.

For example, the misfire detection device, together with the four-stroke engine, is mounted in an apparatus. The four-stroke engine and the misfire detection device are mounted in a vehicle, for example. The four-stroke engine and the misfire detection device may, however, be applied to an apparatus different from vehicles. The four-stroke engine and the misfire detection device may be applied to an electric power generator, for example.

The four-stroke engine is, for example, a single-cylinder engine or an engine with two or more cylinders.

The rotator is rotated by the four-stroke engine. The rotator may not necessarily be configured to receive a driving force directly from the four-stroke engine. The rotator may receive a driving force indirectly from the four-stroke engine with interposition of a mechanism different from the four-stroke engine. The rotator is, for example, a crankshaft, a gear, a wheel, a propeller, or the like.

The wrapping transmission element is, for example, a chain or a belt. The transmission wheel may be, for example, a sprocket or a pulley. The wrapping transmission element may be, for example, a cogged belt.

(2) The misfire detection device of (1) further includes an information output unit configured to output, to outside of the misfire detection device, detection information indicating a detection result about the periodic fluctuation obtained by the periodic fluctuation detection unit.

In the misfire detection device of (2), detection information indicating a detection result about the periodic fluctuation is outputted. This enables distinction between cases where the validity of a determination result about the presence or absence of a misfire is high and low depending on an influence of the periodic fluctuation. Accordingly, in a situation where a determination result about the presence or absence of a misfire is used, the reliability of information used is enhanced.

It is not essential that the information output unit outputs information indicating a detection result about a periodic fluctuation each time the periodic fluctuation detection unit determines the periodic fluctuation. For example, it may be acceptable that the information output unit stores a determination result about a periodic fluctuation each time the periodic fluctuation detection unit determines the periodic fluctuation. The information output unit may output information about a periodic fluctuation if the determination result about the periodic fluctuation thus stored satisfies a predetermined condition.

A device to which the misfire announcing unit and/or the information output unit outputs information is, for example, a lamp or an image display device. The device to which the misfire announcing unit and/or the information output unit outputs information may be, for example, a diagnosis device that gets connected to the misfire detection device at an arbitrary timing.

In a case where the device that receives information from the information output unit is a device that gets connected to the misfire detection device at an arbitrary timing, for example, the information output unit may output the information upon connection with the device.

(3) The misfire detection device of (2), wherein
the information output unit outputs the detection information as information indicating an abnormality of the one element, based on detection of the periodic fluctuation performed by the periodic fluctuation detection unit.

In the misfire detection device of (3), an abnormal state of the one element can be announced based on detection of the periodic fluctuation. The information indicating an abnormality of the one element not only enables distinction of the validity of a determination result about the presence or absence of a misfire, but also facilitates repair or renewal of the one element. This can contribute to enhancing the validity of the determination.

(4) The misfire detection device of any one of (1) to (3), wherein
the misfire determination unit stops determining the presence or absence of a misfire in the four-stroke engine for at least part of a period in which the four-stroke engine is in operation, based on detection of the periodic fluctuation performed by the periodic fluctuation detection unit.

In the misfire detection device of (4), the determination of the presence or absence of a misfire in the four-stroke engine is stopped for at least part of a period in which the four-stroke engine is in operation, based on detection of the periodic fluctuation performed by the periodic fluctuation detection unit. The determination of the presence or absence of a misfire can be stopped in a situation where the reliability of the determination of the presence or absence of a misfire is likely to be lowered due to the periodic fluctuation. This can reduce an output of a determination result having a low validity. Accordingly, the reliability of the determination of the presence or absence of a misfire is further enhanced.

(5) The misfire detection device of any one of (1) to (4), wherein
the periodic fluctuation detection unit detects the periodic fluctuation based on a circulation cycle of the one element and a rotation speed of the rotator acquired by the rotation speed acquisition unit.

In the misfire detection device of (5), the periodic fluctuation is detected based on a circulation cycle of the one element and a rotation speed of the rotator, and therefore a periodic fluctuation associated with the one element is detected precisely. Accordingly, the reliability of the determination of the presence or absence of a misfire is further enhanced.

One of methods for detecting the periodic fluctuation based on a circulation cycle of the one element and a rotation speed of the rotator is, for example, to identify whether or not a specific fluctuation pattern appears on the circulation cycle. One of methods for detecting the periodic fluctuation is, for example, to convert a rotation speed change into a frequency domain.

(6) The misfire detection device of (5), wherein
the periodic fluctuation detection unit detects the periodic fluctuation by executing computation using one rotation speed of the rotator acquired by the rotation speed acquisition unit and another rotation speed of the rotator acquired by the rotation speed acquisition unit a certain period before acquisition of the one rotation speed, the certain period having a length corresponding to a positive integer multiple of the circulation cycle.

In the misfire detection device of (6), computation is executed using one rotation speed of the rotator acquired by the rotation speed acquisition unit and another rotation speed of the rotator acquired by the rotation speed acquisition unit a certain period before acquisition of the one rotation speed, the certain period having a length corresponding to a positive integer multiple of the circulation cycle, and thus the periodic fluctuation can be detected through simple computation. This enables the periodic fluctuation to be precisely detected with a limited time. Accordingly, the reliability of the determination of the presence or absence of a misfire is further enhanced.

For example, the following computation can be adopted as the computation using one rotation speed of the rotator acquired by the rotation speed acquisition unit and another rotation speed of the rotator acquired by the rotation speed acquisition unit a certain period before acquisition of the one rotation speed, the certain period having a length corresponding to a positive integer multiple of the circulation cycle.

Such computation that a value resulting from the computation increases as the correlation among repeated periodic fluctuations is higher.

Such computation that a value resulting from the computation increases as the amplitude of a periodic fluctuation is larger.

As the computation above, the periodic fluctuation detection unit executes autocorrelation function computation, for example. The computation is not limited to the above. As the computation, such computation that a value resulting from the computation increases in accordance with the correlation or the amplitude is adoptable, too.

The certain period having a length corresponding to a positive integer multiple of the circulation cycle is, for example, equal to the circulation cycle. The certain period having a length corresponding to a positive integer multiple of the circulation cycle may be, for example, at least twice as long as the circulation cycle.

(7) The misfire detection device of any one of (1) to (6), wherein
the wrapping transmission element is configured to mesh with the plurality of transmission wheels.

In a case of the wrapping transmission element being configured to mesh with the plurality of transmission wheels, a rotation speed fluctuation caused by an abnormality of at least one element of the wrapping transmission element or the plurality of transmission wheels is likely to occur on the circulation cycle of the one element. In the misfire detection device of (7), a periodic fluctuation in the rotation speed caused by an abnormality of the one element can be detected as information for determining the validity of a misfire detection. Accordingly, the reliability of the determination of the presence or absence of a misfire is enhanced.

(8) The misfire detection device of (7), wherein
the plurality of extreme values occur in a fluctuation in the rotation speed of the four-stroke engine, and are caused by meshing between the wrapping transmission element and any of the plurality of transmission wheels.

In the misfire detection device of (8), a periodic fluctuation in the rotation speed having a plurality of extreme values, which is caused by an abnormality of at least one element of the wrapping transmission element or the plurality of transmission wheels, can be detected as information for determining the validity of a misfire detection. Accordingly, the reliability of the determination of the presence or absence of a misfire is enhanced.

(9) A vehicle including:
a plurality of transmission wheels;
a wrapping transmission element wrapped around the plurality of transmission wheels so as to move circularly;
a four-stroke engine that drives the wrapping transmission element; and
a rotator that is rotated by the four-stroke engine,
the vehicle further including the misfire detection device of any one of (1) to (8).

The vehicle of (9) has an enhanced reliability of a misfire detection performed by the misfire detection device.

Examples of the vehicle include straddled vehicles such as motorcycles, three-wheel vehicles, or four-wheel vehicles. The vehicle may be a four-wheel vehicle having a cabin. The vehicle is a manned vehicle or an unmanned transport system. The vehicle may be, for example, an engine-driven outboard motor with a propeller.

In a case of the misfire detection device provided in the vehicle, the misfire determination unit detects that the vehicle is traveling on a rough road. It however is not essential that the misfire determination unit detects rough road traveling.

Advantageous Effects of Invention

The present teaching can provide a misfire detection device and a vehicle with an enhanced detection reliability.

BRIEF DESCRIPTION OF THE DRAWINGS

FIG. 5 is a graph showing a first exemplary rotation speed of a crankshaft rotated by an engine.

FIG. 6 is a graph showing a second exemplary rotation speed of the crankshaft rotated by the engine.

FIG. 8 is a graph showing, on an enlarged scale, a crankshaft rotation speed fluctuation in a case of using a deteriorated wrapping transmission element.

DETAILED DESCRIPTION

The following describes embodiments of the present teaching with reference to the drawings.

Figure 1:
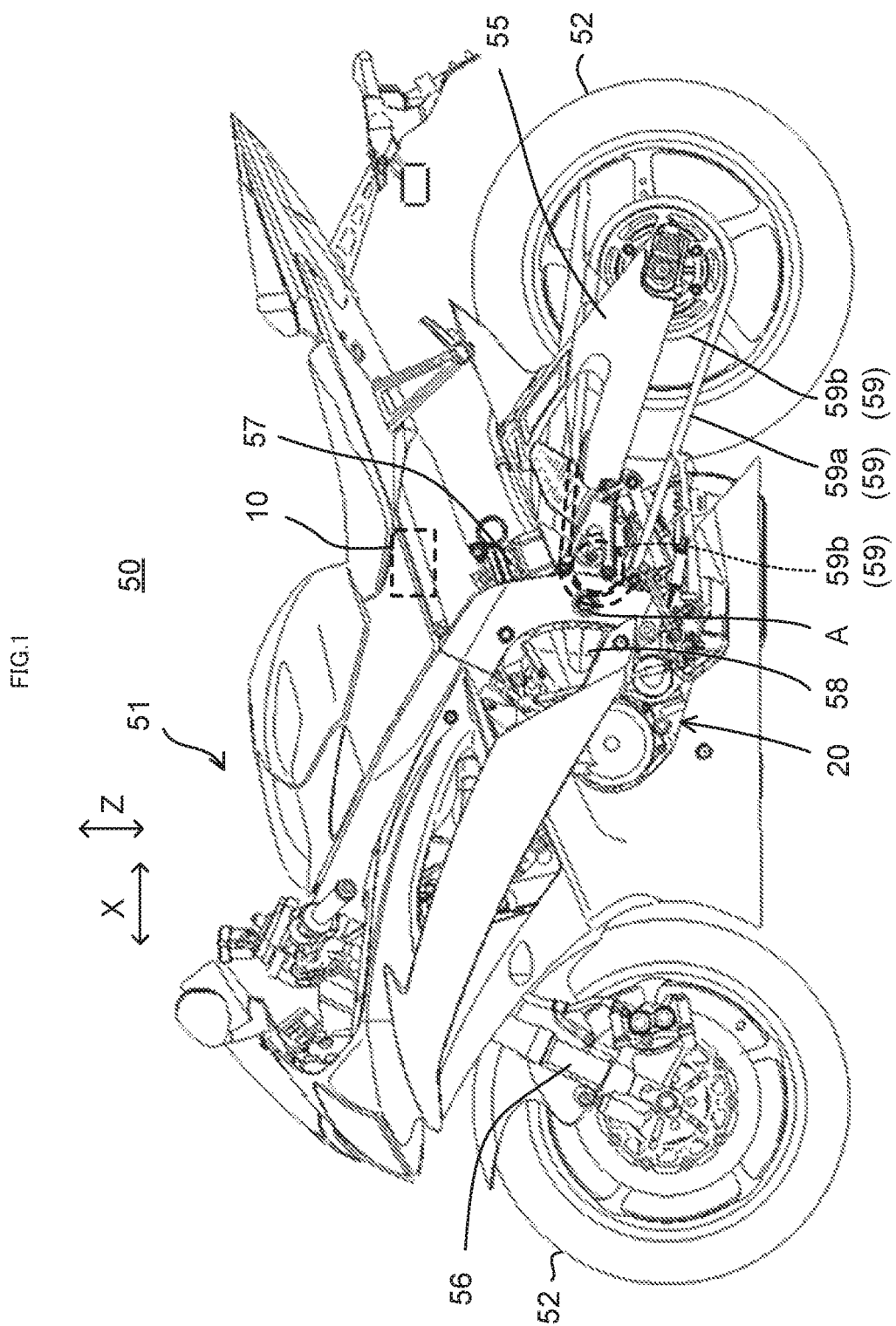
FIG. 1 is a diagram showing an external appearance of a vehicle equipped with a misfire detection device according to a first embodiment of the present teaching.

FIG. 1 is a diagram showing an external appearance of a vehicle equipped with a misfire detection device according to a first embodiment of the present teaching.

A vehicle 50 shown in FIG. 1 includes a vehicle body 51 and wheels 52. The vehicle 50 is a motorcycle with two wheels 52. The wheels 52 are provided to the vehicle body 51 of the vehicle 50, and are arranged one behind the other in a front-rear direction X of the vehicle 50. The vehicle body 51 has suspensions 56, 57. The wheels 52 are supported by the suspensions 56, 57. The vehicle body 51 has a swing arm 55 that is swingable in an up-down direction Z about a shaft A extending in a left-right direction of the vehicle body 51. An end of the swing arm 55 supports the rear wheel 52, the end being on the side opposite to the shaft A. Thus, the rear wheel 52 is supported so as to be swingable in the up-down direction Z about the shaft A extending in the left-right direction of the vehicle body 51.

The vehicle 50 includes a control device 10, a four-stroke engine 20, a wrapping transmission element 59a, and a plurality of transmission wheels 59b. The four-stroke engine 20 may be simply referred to as an engine 20. The control device 10 and the engine 20 are provided in the vehicle body 51.

The wrapping transmission element 59a, which is endless, is wrapped around the plurality of transmission wheels 59b. The wrapping transmission element 59a moves circularly along with rotation of the transmission wheels 59b. In this embodiment, the wrapping transmission element 59a is configured to mesh with the plurality of transmission wheels 59b. The wrapping transmission element 59a is a chain. The transmission wheels 59b are sprockets.

The engine 20 drives the wrapping transmission element 59a via a transmission 58. A driving force of the engine 20 is transmitted to the wheel 52 through the wrapping transmission element 59a and the transmission wheels 59b. The engine 20 drives the wheel 52.

The wrapping transmission element 59a and the plurality of transmission wheels 59b transfer the driving force of the engine 20. At least one of the wrapping transmission element 59a or the plurality of transmission wheels 59b may be also called a transfer element 59.

The control device 10 detects a misfire in the engine 20. The control device 10 corresponds to an example of the misfire detection device of the present teaching. In this Description, the control device 10 may be also called a misfire detection device 10. The control device 10 controls the engine 20.

[Control Device]

Figure 2:
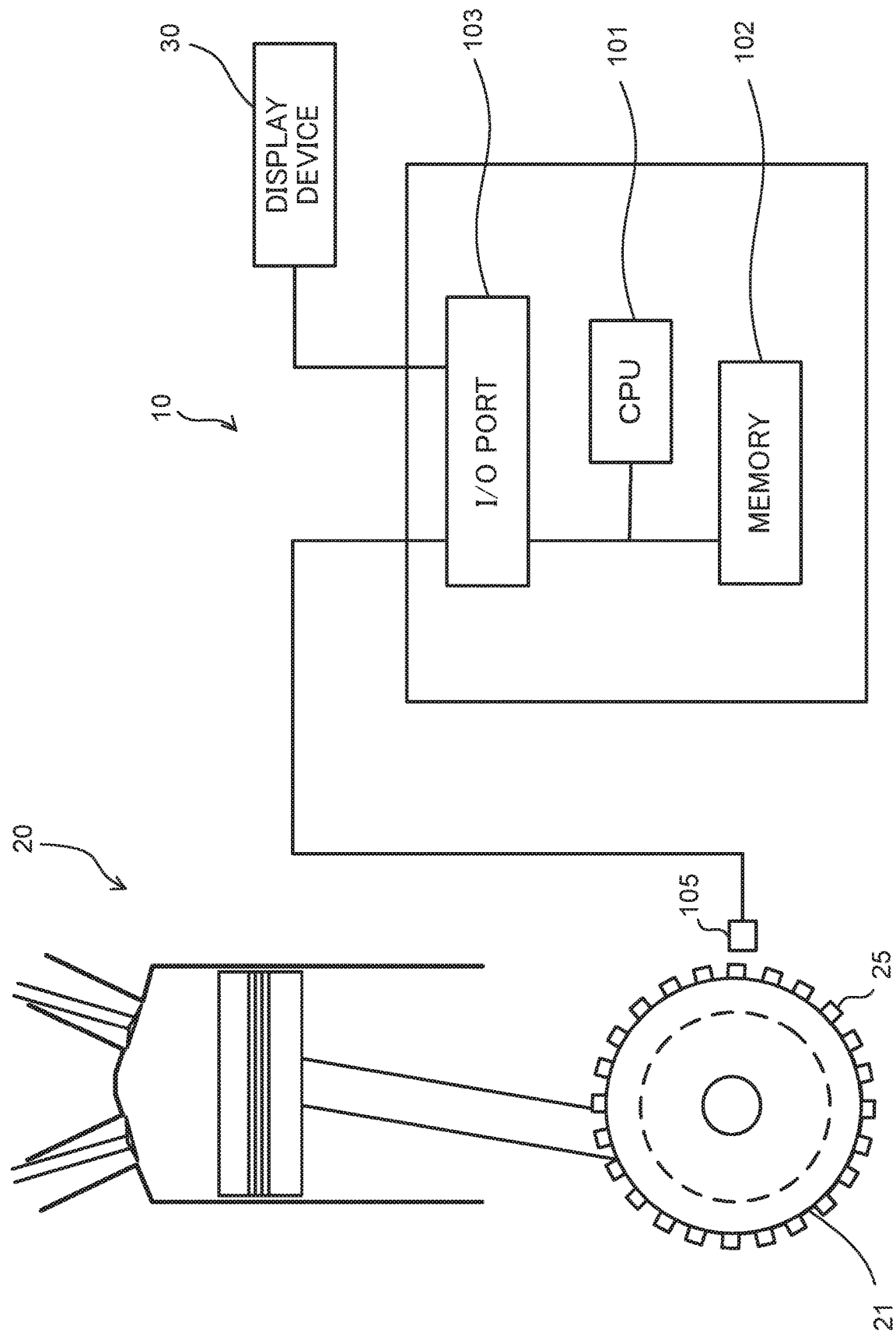
FIG. 2 is a configuration diagram schematically showing configurations of a control device shown in FIG. 1 and of its peripheral devices.

FIG. 2 is a configuration diagram schematically showing configurations of the control device shown in FIG. 1 and of its peripheral devices.

The control device (misfire detection device) 10 shown in FIG. 2 is a device for the four-stroke engine 20 (engine 20). The engine 20 of this embodiment is a three-cylinder engine. FIG. 2 shows a configuration corresponding to one cylinder. Here, a single-cylinder engine or a two-cylinder engine is also adoptable as the engine 20. An engine with four or more cylinders is also adoptable.

The engine 20 includes a crankshaft 21. The crankshaft 21 corresponds to an example of the rotator of the present teaching. The crankshaft 21 rotates along with operations of the engine 20. That is, the crankshaft 21 is rotated by the engine 20. The crankshaft 21 is provided with a plurality of detection object parts 25 for detection of rotation of the crankshaft 21. The detection object parts 25 are arranged in a circumferential direction of the crankshaft 21 and are spaced from one another by predefined detection angles when viewed from the rotation center of the crankshaft 21. The detection angle is 15 degrees, for example. The detection object parts 25 move as the crankshaft 21 rotates.

The control device 10 includes a CPU (Central Processing Unit) 101, a memory 102, and an I/O port 103.

The CPU 101 executes a computing process based on a control program. The memory 102 stores the control program and information necessary for computation. The I/O port 103 inputs and outputs signals from and to an external device.

A rotation sensor 105 for detecting rotation of the crankshaft 21 is connected to the I/O port 103. The rotation sensor 105 is a sensor for obtaining a rotation speed of the crankshaft 21 of the engine 20. The rotation sensor 105 outputs a signal upon detecting that the detection object part 25 is passing. The rotation sensor 105 outputs a signal each time the crankshaft 21 of the engine 20 rotates through the detection angle.

A display device 30 is also connected to the I/O port 103. The display device 30 displays information outputted from the control device 10.

The control device 10 of this embodiment detects a misfire in the engine 20 based on the rotation speed of the crankshaft 21. The control device 10 of this embodiment also has a function as an electronic control device (ECU) for controlling operations of the engine 20. An intake pressure sensor, a fuel injection device, and a spark plug, all of which are not shown, are also connected to the control device 10.

Figure 3:
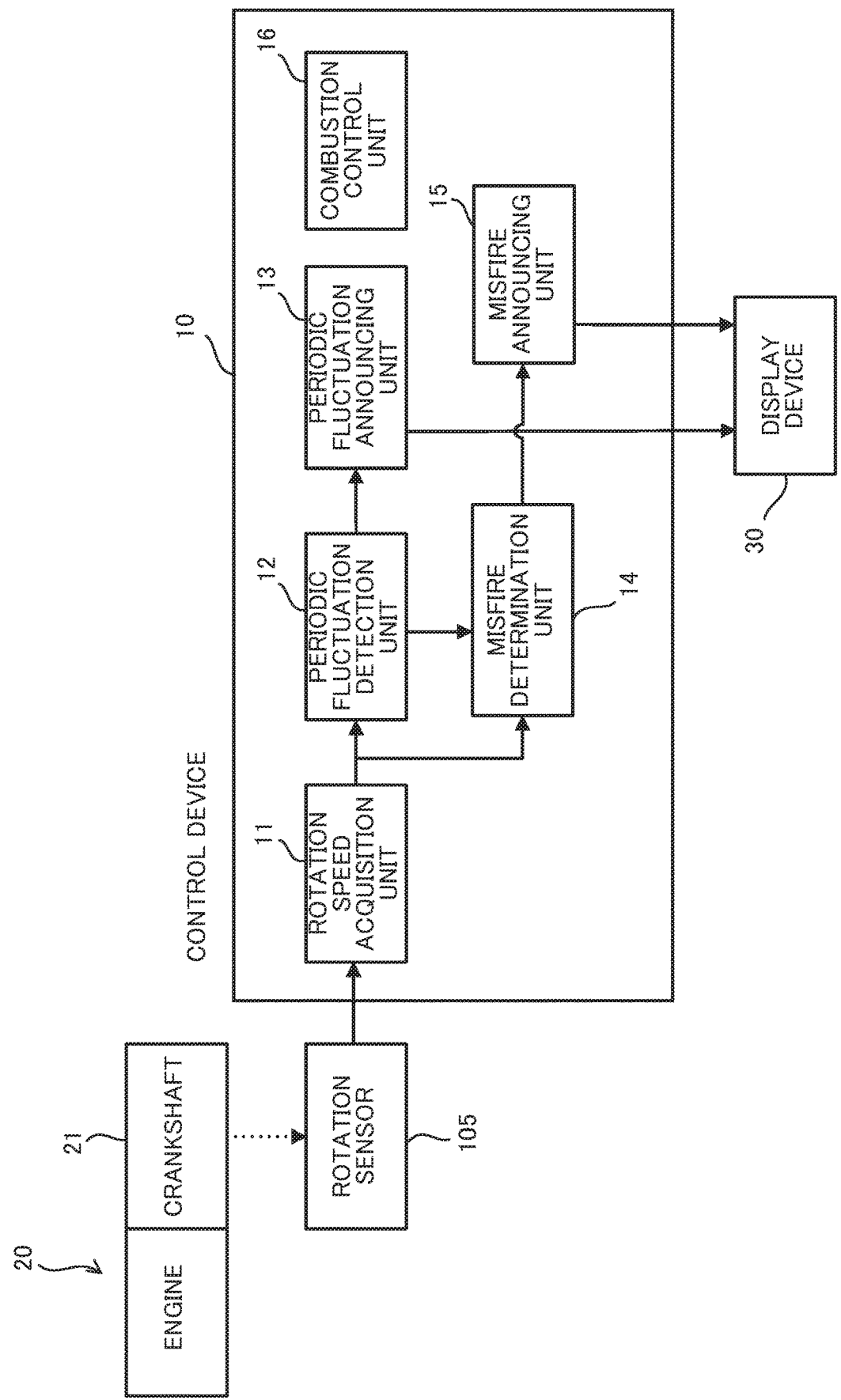
FIG. 3 is a block diagram showing a configuration of the control device of FIG. 2.

FIG. 3 is a block diagram showing a configuration of the control device 10 of FIG. 2.

The control device 10 includes a rotation speed acquisition unit 11, a periodic fluctuation detection unit 12, a periodic fluctuation announcing unit 13, a misfire determination unit 14, a misfire announcing unit 15, and a combustion control unit 16. The CPU 101 (see FIG. 2), which executes the control program, controls hardware shown in FIG. 2, thus implementing the respective units of the control device 10.

The rotation speed acquisition unit 11 acquires a rotation speed of the crankshaft 21 based on an output of the rotation sensor 105.

The periodic fluctuation detection unit 12 detects a fluctuation contained in a rotation fluctuation of the engine 20, the fluctuation being repeated on a circulation cycle of the transfer element 59 (see FIG. 1). The periodic fluctuation detection unit 12 detects a periodic fluctuation that is repeated on a circulation cycle of the transfer element 59, based on a rotation speed of the crankshaft 21 acquired by the rotation speed acquisition unit 11. The periodic fluctuation detection unit 12 of this embodiment detects a periodic fluctuation that is repeated on a circulation cycle of the wrapping transmission element 59a.

The periodic fluctuation announcing unit 13 outputs detection information to the display device 30 which is outside the control device 10, the detection information indicating a result of the periodic fluctuation detection unit 12 detecting a periodic fluctuation. Accordingly, detection of a periodic fluctuation is announced. The periodic fluctuation announcing unit 13 may be also called an information output unit 13.

The misfire determination unit 14 detects a misfire in the engine 20 based on a rotation speed of the crankshaft 21 acquired by the rotation speed acquisition unit 11. The misfire determination unit 14 detects rough road traveling. In detail, the misfire determination unit 14 detects whether or not the vehicle 50 (see FIG. 1) equipped with the engine 20 and the control device 10 is traveling on a rough road, based on a rotation speed acquired by the rotation speed acquisition unit 11. Alternatively, for example, the misfire determination unit 14 may not rely on a rotation speed acquired by the rotation speed acquisition unit 11, for detecting rough road traveling. Rough road traveling may be detected based on, for example, a rotation speed of the wheels 52.

The misfire announcing unit 15 outputs misfire detection information to the display device 30, the misfire detection information indicating a result of the misfire determination unit 14 determining the presence or absence of a misfire. Accordingly, detection of a misfire is announced. The misfire announcing unit 15 also outputs a detection result about the rough road traveling.

The combustion control unit 16 controls a combustion operation of the engine 20 by controlling the fuel injection device and the spark plug (not shown).

Figure 4:
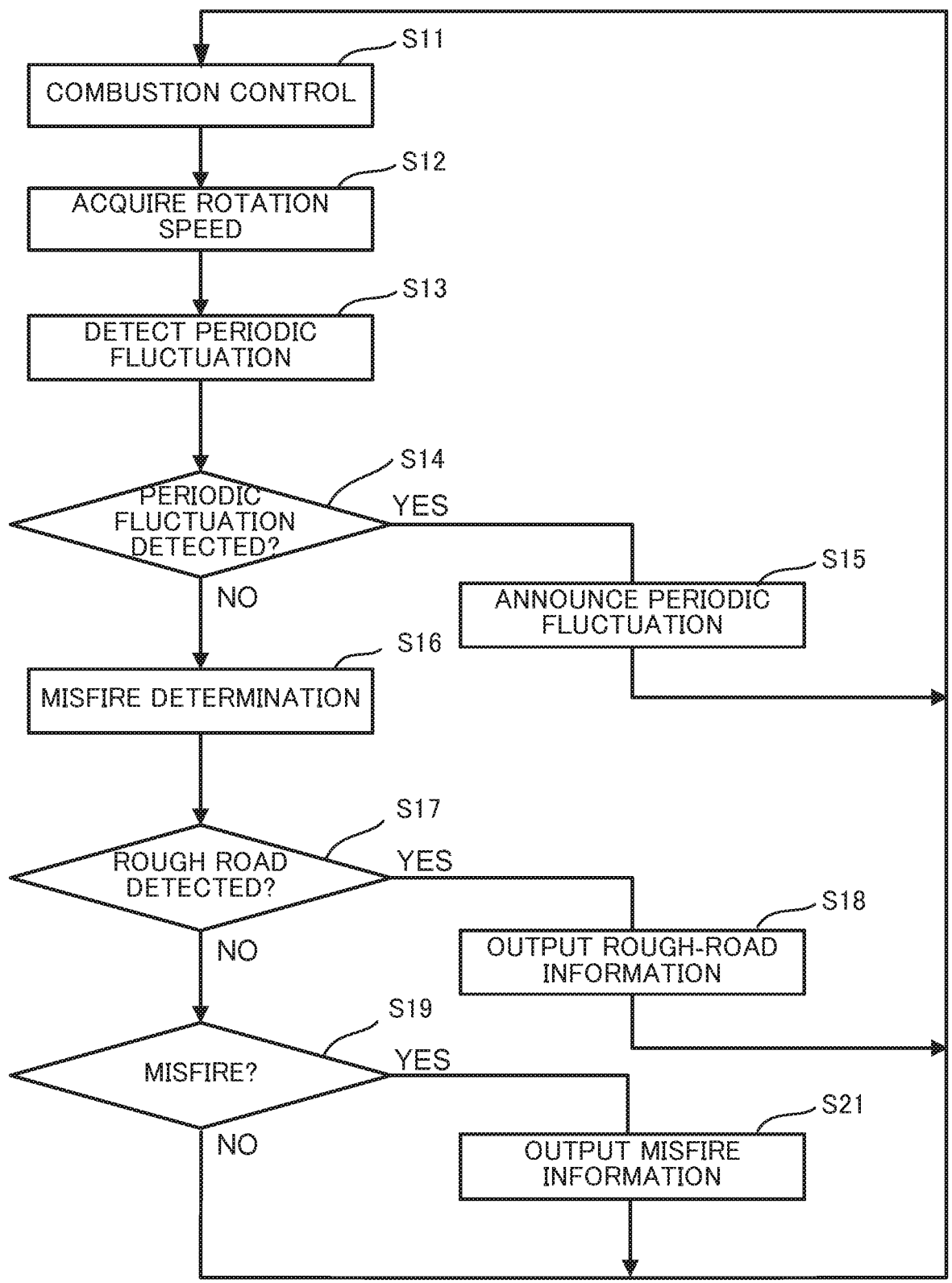
FIG. 4 is a flowchart showing operations of the control device of FIG. 3.

FIG. 4 is a flowchart showing operations of the control device 10 of FIG. 3.

In the control device 10, processing shown in FIG. 4 is repeated. First, the combustion control unit 16 controls the combustion operation of the engine 20 (S11). Then, the rotation speed acquisition unit 11 acquires a rotation speed of the crankshaft 21 of the engine 20 (S12). Then, the periodic fluctuation detection unit 12 tries detecting a periodic fluctuation contained in a rotation fluctuation of the engine 20, the periodic fluctuation being repeated on a circulation cycle of the transfer element 59 (S13). If the periodic fluctuation detection unit 12 detects a periodic fluctuation (S14: Yes), the periodic fluctuation announcing unit 13 outputs detection information indicating detection of the periodic fluctuation. If the periodic fluctuation detection unit 12 does not detect a periodic fluctuation that is repeated on a circulation cycle of the transfer element 59 (S14: No), the misfire determination unit 14 determines the presence or absence of a misfire in the engine 20 (S16). The misfire determination unit 14 also tries detecting rough road traveling. Each of the rotation speed acquisition unit 11, the periodic fluctuation detection unit 12, the periodic fluctuation announcing unit 13, and the misfire determination unit 14 executes data processing when its processing object data becomes processable.

If the misfire determination unit 14 detects rough road traveling (S17: Yes), the misfire announcing unit 15 outputs information indicating a detection result about the rough road traveling (S18). If the misfire determination unit 14 does not detect rough road traveling (S17: No) and the presence of a misfire is determined (S19: Yes), the misfire announcing unit 15 outputs information indicating a detection result about the misfire (S21).

The order in which the rotation speed acquisition unit 11, the periodic fluctuation detection unit 12, the periodic fluctuation announcing unit 13, the misfire determination unit 14, the misfire announcing unit 15, and the combustion control unit 16 are operated is not limited to the one shown in FIG. 4. Some parts of the processing may be collectively executed by computing a single expression.

It may not be always necessary that the misfire announcing unit 15 outputs information indicating the presence of a misfire whenever the misfire determination unit 14 determines the presence of the misfire. For example, it may be acceptable that the misfire determination unit 14 stores a determination result indicating the presence of a misfire each time the misfire determination unit 14 determines the presence of a misfire, and the misfire announcing unit 15 outputs information indicating the presence of a misfire if the determination result indicating the presence of a misfire, which is stored, satisfies a predetermined condition. The predetermined condition is, for example, that the presence of a misfire be determined with a predetermined frequency. It may not be always necessary that the misfire announcing unit 15 outputs information indicating rough road traveling whenever the misfire determination unit 14 determines the rough road traveling. For example, it may be acceptable that the misfire determination unit 14 stores a determination result about rough road traveling each time the misfire determination unit 14 determines rough road traveling, and the misfire announcing unit 15 outputs information indicating rough road traveling if the determination result about rough road traveling, which is stored, satisfies a predetermined condition. It may not be always necessary that the periodic fluctuation announcing unit 13 outputs information indicating a detection result about a periodic fluctuation whenever the periodic fluctuation detection unit 12 determines the periodic fluctuation. For example, it may be acceptable that the periodic fluctuation announcing unit 13 stores a determination result about a periodic fluctuation each time the periodic fluctuation detection unit 12 determines a periodic fluctuation, and the periodic fluctuation announcing unit 13 outputs information indicating a periodic fluctuation if the determination result about a periodic fluctuation, which is stored, satisfies a predetermined condition. In a case where, for example, the display device 30 shown in FIG. 2 is a diagnosis device that gets connected to the control device 10 at an arbitrary timing, the periodic fluctuation announcing unit 13 or the misfire announcing unit 15 may output information when the display device 30 gets connected to the control device 10.

Details of the units shown in FIG. 3 and FIG. 4 will now be described.

[Rotation Speed Acquisition Unit]

The rotation speed acquisition unit 11 acquires a rotation speed of the crankshaft 21 based on a signal supplied from the rotation sensor 105 (see FIG. 2). The rotation sensor 105 outputs a signal each time the crankshaft 21 rotates through the detection angle. The rotation speed acquisition unit 11 measures a time interval of timings at which signals are outputted from the rotation sensor 105, thus measuring a time required for the crankshaft 21 to rotate through the detection angle. Measuring this time serves to determine a rotation speed, which is to be acquired by the rotation speed acquisition unit 11. That is, the rotation speed acquisition unit 11 acquires a rotation speed of the crankshaft 21 by using the crank angle as a reference of an acquisition timing. To be specific, the rotation speed acquisition unit 11 acquires a rotation speed of the crankshaft 21 at every certain crank angle. In this embodiment, a rotation speed acquired by the rotation speed acquisition unit 11 is a rotation speed of the crankshaft 21, and therefore a rotation speed acquired by the rotation speed acquisition unit 11 is a rotation speed of the engine 20.

A rotation speed fluctuation of the engine 20 contains a fluctuation attributable to combustion of the engine 20. The fluctuation attributable to combustion of the engine 20 has an angular period shorter than the crank angle degrees corresponding to four strokes. The rotation speed fluctuation of the engine 20 sometimes contains not only the fluctuation attributable to combustion of the engine 20 but also a fluctuation attributable to factors external to the engine 20, such as a structure of the vehicle 50.

The rotation speed acquisition unit 11 of this embodiment also acquires, as the rotation speed, a rotation speed corresponding to a section that covers a plurality of detection angles. For example, the rotation speed acquisition unit 11 acquires a rotation speed in a section of 180 crank angle degrees that corresponds to an explosion stroke of each cylinder, and a rotation speed in a section of 180 crank angle degrees that corresponds to each stroke interposed between the explosion strokes.

FIG. 5 is a graph showing a first exemplary rotation speed of the crankshaft 21 rotated by the engine 20.

In FIG. 5, the horizontal axis represents a rotation angle θ of the crankshaft. The vertical axis represents the rotation speed. In the first example shown in FIG. 5, for better illustration of the relationship of the rotation speed, a rotation speed not containing a periodic fluctuation that is repeated on a circulation cycle of the transfer element 59 is shown. FIG. 5 schematically shows a rotation speed fluctuation involved in the combustion operation of the engine 20.

An alternate long and short dash line graph indicates a rotation speed OMG' which is acquired each time a signal is outputted from the rotation sensor 105 in response to passage of one detection object part 25. The alternate long and short dash line graph is a curve obtained by connecting rotation speeds OMG' each acquired upon passage of each detection object part 25. The rotation speed OMG' is acquired based on a time interval of the signal output. That is, the rotation speed OMG' is a rotation speed at every detection angle. The rotation speed OMG' represents an instantaneous rotation speed.

The engine 20 of this embodiment is a three-cylinder four-stroke engine that causes explosions at even intervals. Thus, a rotation speed peak corresponding to the same stroke of each cylinder comes every 720/3 degrees, that is, every 240 crank-angle degrees.

A solid line graph indicates a rotation speed OMG in a section that covers a plurality of detection angles. The solid line graph indicates a rotation speed OMG in a section of 180 crank angle degrees.

The rotation speed acquisition unit 11 acquires a value of the rotation speed OMG by calculating an average of the rotation speeds OMG', which are acquired at every detection angle, over the section of 180 crank angle degrees. A value of the rotation speed OMG at each point can be also acquired by accumulating and summing time intervals of signals received from the rotation sensor 105 over a plurality of sections. The graph of rotation speed OMG is a curve obtained by connecting points of values that are acquired every 120 crank angle degrees (every half of 240 crank angle degrees corresponding to the same stroke of each cylinder). Thus, a peak position in the graph of rotation speed OMG may be different from a peak position in the instantaneous rotation speed. In the graph of rotation speed OMG, a value at each point indicates a speed in a section of 180 crank angle degrees including the point. It should be noted that the angle of 180 degrees is one example of a section for which the value of the rotation speed OMG is calculated. In this example, a value of the rotation speed OMG is acquired by calculating an average of instantaneous rotation speeds over 90-degrees sections immediately before and after a rotation angle corresponding to that value. The graph of rotation speed OMG is a curve obtained by connecting average values thus acquired.

The rotation speed OMG has a smaller fluctuation amplitude than that of the rotation speed OMG' which is an instantaneous rotation speed at each detection angle. The rotation speed OMG, however, exhibits a rotation fluctuation attributable to combustion of the engine 20. The control device 10 of this embodiment uses the rotation speed OMG in a section of 180 crank angle degrees, to detect the presence or absence of a misfire in the engine 20.

Here, it is also acceptable that an angle range other than 180 crank angle degrees is adopted as a section for which a value of the rotation speed OMG is calculated. For example, an angle range narrower than 180 degrees, such as 120 crank angle degrees or 90 crank angle degrees, is adoptable as a section for which the rotation speed OMG is calculated. Alternatively, for example, the detection angle which is 15 crank angle degrees may be used as a section for which the rotation speed OMG is calculated. In other words, the rotation speed OMG' may be used as the rotation speed OMG. That is, an angle range equal to or narrower than 180 degrees is adoptable as a section for which a value of the rotation speed OMG is calculated.

Such a section of 180 crank angle degrees is not necessarily set to completely overlap each stroke, and it may be shifted from each stroke.

In the description of this embodiment, a rotation speed OMG, an averaged rotation speed, and the like, are used as the rotation speed. How to express these rotation speeds is not particularly limited. For example, the rotation speed may be expressed as a time required for the crankshaft 21 to rotate through a predefined angle, or may be expressed as a rotational frequency or angle per unit time, which is computed as a reciprocal for the time.

[Misfire Determination Unit]

The misfire determination unit 14 shown in FIG. 3 determines the presence or absence of a misfire in the engine 20 based on a rotation fluctuation attributable to combustion of the engine 20. The misfire determination unit 14 determines the presence or absence of a misfire in the engine 20 based on a rotation speed of the crankshaft 21 acquired by the rotation speed acquisition unit 11.

The misfire determination unit 14 calculates a fluctuation amount in the rotation speed OMG of the engine 20, between cylinders in which the same stroke successively occurs. The misfire determination unit 14 determines a misfire in the four-stroke engine by calculating the fluctuation amount.

FIG. 6 is a graph showing a second exemplary rotation speed of the crankshaft 21 rotated by the engine 20.

In the graph of FIG. 6, the horizontal axis represents a rotation angle θ of the crankshaft 21, and the vertical axis represents the rotation speed. A rotation angle range shown in the graph of FIG. 6 is wider than that shown in the graph of FIG. 5. Similarly to FIG. 5, a graph drawn with the solid line indicates a rotation speed OMG of the crankshaft 21, that is, a rotation speed of the engine 20. The graph roughly indicates a fluctuation in the rotation speed OMG. Similarly to FIG. 5, the graph of the rotation speed OMG is a curve obtained by connecting rotation speed values that are calculated for crank angles corresponding to explosion strokes and intake strokes.

The graph of FIG. 6 shows a transition of the rotation speed OMG on a crank angle basis, instead of a transition of the rotation speed on a time basis.

The engine 20 of this embodiment is a three-cylinder four-stroke engine that causes explosions at even intervals. A rotation speed peak which corresponds to a compression stroke of each cylinder appears every 240 crank angle degrees.

In the graph of FIG. 6, a detection object crank angle position at a certain time point is numbered "0", and positions at every 120 crank-angle degrees from the "0" position are numbered sequentially. In the example shown in FIG. 6, an intake stroke (#3S) of a third cylinder among the three cylinders is defined as the "0" position that is the detection object at the certain time point. The "0" position is an intermediate position between the "1" position which corresponds to an explosion stroke (#1W) of a first cylinder and the "−1" position which corresponds to an explosion stroke (#2W) of a second cylinder. The "2", "4", and "6" positions correspond to intake strokes (#2S, #1S, #3S) of the second cylinder, the first cylinder, and the third cylinder, respectively.

Values of the rotation speed OMG at the respective positions "0", "1", "2" . . . are expressed as OMG0, OMG1, OMG2 . . . . A rotation speed of the crankshaft 21 acquired by the rotation speed acquisition unit 11 is a rotation speed of the engine 20. In the description, therefore, the rotation speed OMG of the crankshaft 21 is considered as the rotation speed OMG of the engine 20.

The graph of the rotation speed OMG of the crankshaft 21 shown in FIG. 6 indicates a rotation fluctuation (fluctuation in the rotation speed) of the engine 20.

The rotation fluctuation of the engine 20 contains a rotation fluctuation attributable to the combustion operation of the engine 20. The rotation fluctuation attributable to the combustion operation has repetition periods, the number of which corresponds to the number of cylinders, per 720 crank angle degrees. The rotation fluctuation in the rotation speed OMG shown in FIG. 6 has three repetition periods per 720 crank-angle degrees. Thus, the rotation fluctuation attributable to the combustion operation of the engine 20 has a period shorter than a crank angle range (720 degrees) corresponding to four strokes.

The misfire determination unit 14 calculates a fluctuation amount in the rotation speed OMG of the engine 20, between cylinders in which the same stroke successively occurs. The misfire determination unit 14 determines a misfire in the four-stroke engine by calculating the fluctuation amount.

In detail, the misfire determination unit 14 calculates a difference between rotation speeds in the cylinders in which the same stroke successively occurs. The misfire determination unit 14 uses, as the rotation speed, a rotation speed OMG of the engine 20. The difference thus calculated will be called a first fluctuation amount. For example, when the "0" position shown in FIG. 6 is set as a detection object position, the "0" and "2" positions are crank angle positions corresponding to cylinders in which the same stroke successively occurs. For example, the "2" position corresponds to an intake stroke of the second cylinder (#2S in FIG. 6). The "0" position corresponds to an intake stroke of the third cylinder (#3S in FIG. 6). Thus, the intake stroke of the second cylinder and the intake stroke of the third cylinder successively occur in the "2" and "0" positions. The first fluctuation amount is a difference between a rotation speed OMG2 and a rotation speed OMG0. The rotation speed OMG2 is a rotation speed at the "2" position shown in FIG. 6. The rotation speed OMG0 is a rotation speed at the "0" position.

The misfire determination unit 14 also calculates a difference between cylinders in which the same stroke successively occurs at positions 720 crank angle degrees before the positions of the crankshaft 21 where the first fluctuation amount is calculated. This difference will be called a second fluctuation amount. Positions of the crankshaft corresponding to cylinders in which the same stroke successively occurs at positions 720 crank angle degrees before are the "6" and "8" positions. The second fluctuation amount is a difference between a rotation speed OMG8 and a rotation speed OMG6. The rotation speed OMG6 is a rotation speed OMG of the engine 20 at the "6" position. The rotation speed OMG8 is a rotation speed at the "8" position.

The misfire determination unit 14 also calculates, as a fluctuation index ΔOMG, a difference between the first fluctuation amount and the second fluctuation amount. If the fluctuation index ΔOMG is within a predetermined misfire determination range, the misfire determination unit 14 determines the presence of a misfire. This is because a difference in the fluctuation amount obtained in a case of a misfire occurring is distributed in a predetermined range. For example, if the fluctuation index ΔOMG is greater than a misfire determination value CK, the misfire determination unit 14 determines the presence of a misfire. The misfire determination value CK is a lower limit of the misfire determination range. If the fluctuation index ΔOMG is less than the misfire determination value CK, the misfire determination unit 14 determines the absence of a misfire.

In FIG. 6, the broken line MS_OMG indicates a rotation speed fluctuation in a case of a misfire occurring. The broken line MS_OMG roughly indicates a rotation speed fluctuation in a case of a misfire occurring in the explosion stroke (#1W) of the first cylinder. In a case of a misfire occurring, an increase in the rotation speed due to explosion does not occur, so that the rotation speed keeps decreasing from an explosion stroke (#3W) of a cylinder previous to the first cylinder to an explosion stroke (#2W) of a cylinder next to the first cylinder. That is, the rotation speed OMG0 at the "0" position is lowered as compared to when no misfire occurs. Consequently, the first fluctuation amount at the "0" position increases as compared to when no misfire occurs. In this case, the fluctuation index ΔOMG at the "0" position increases as compared to when no misfire occurs. If the fluctuation index ΔOMG is greater than the misfire determination value CK, the presence of a misfire is determined.

An increase in the fluctuation index ΔOMG can be caused by a factor different from the misfire described above. For example, the fluctuation index ΔOMG increases when the vehicle 50 (see FIG. 1) equipped with the engine 20 travels on a rough road instead of a flat road. While the vehicle 50 is traveling on a rough road, a load fluctuation caused by, for example, roughness of a road surface is transmitted from the wheel 52 (see FIG. 1) to the crankshaft 21 of the engine 20 via the transfer element 59 or the like. As a result, the rotation speed OMG fluctuates. An increase in a fluctuation attributable to rough road traveling, which is contained in the fluctuation in the rotation speed OMG, hinders an appropriate misfire determination by the misfire determination unit 14.

In a case where a rotation speed fluctuates due to rough road traveling, the rotation speed contains a random fluctuation. Thus, the rotation speed changes with irregular periods. The amount of change in the rotation speed is irregular, too. Accordingly, the first fluctuation amount and the second fluctuation amount change at random. Consequently, the fluctuation index ΔOMG changes at random. If the fluctuation index ΔOMG is out of the misfire determination range described above, the misfire determination unit 14 determines that the vehicle 50 (see FIG. 1) is traveling on a rough road. For example, if a frequency with which the fluctuation index ΔOMG exceeds a predetermined rough road determination value is greater than a predetermined value, it is determined that the vehicle 50 (see FIG. 1) is traveling on a rough road. The rough road determination value is set to, for example, an upper limit value that the fluctuation index ΔOMG can take while the vehicle 50 is traveling on a flat road without any misfire. The rough road determination value is less than the misfire determination value CK. At a time of rough road traveling, however, the fluctuation index ΔOMG may exceed the misfire determination value CK.

Here, determining the frequency with which the fluctuation index ΔOMG exceeds the determination value is illustrated as an example of determination. Each determination is not limited to this, and for example, the determination may be based on the number of times the fluctuation index ΔOMG exceeds the determination value.

A rotation speed fluctuation caused by rough road traveling is not a fluctuation attributable to the structure or performance of the engine 20 itself or the vehicle 50. The rotation speed fluctuation caused by rough road traveling reflects environments where the engine 20 or the vehicle 50 is temporarily placed.

[Misfire Announcing Unit]

The misfire announcing unit 15 announces a misfire determination result obtained by the misfire determination unit 14. If the misfire determination unit 14 has determined the presence of a misfire, the misfire announcing unit 15 directs the display device 30 (see FIG. 3) to display the presence of a misfire. The misfire announcing unit 15 also directs the display device 30 to display information indicating rough road traveling. If the misfire determination unit 14 has detected rough road traveling, misfire information indicating a rough road traveling detection result is outputted to the display device 30.

The display device 30 is a lamp, for example. The display device 30 may serve as both a misfire display and a rough road traveling display. The display device 30 may be an image display. The display device 30 may be a diagnosis device which is configured to get connected to the control device 10 for inspection/repair of the vehicle 50, for example. In such a case, the connection of the display device 30 to the control device 10 may not necessarily be constant. While the vehicle 50 is being driven, the misfire announcing unit 15 stores in the memory 102 information indicating a determination result obtained by the misfire determination unit 14. When a diagnosis device serving as the display device 30 gets connected to the control device 10, the misfire announcing unit 15 outputs the information stored in the memory 102. As a result, the diagnosis device serving as the display device 30 displays the determination result obtained by the misfire determination unit 14. In this case, the display device 30 displays a history of the determination result.

The above-described process of the misfire determination unit 14 identifying the presence or absence of a misfire will be collectively described with reference to FIG. 6.

The misfire determination unit 14 determines the presence or absence of a misfire based on a change in the rotation speed fluctuation amount after elapse of a predetermined crank angle period. In more detail, the misfire determination unit 14 determines the presence or absence of a misfire based on a change between first and second fluctuation amounts of the rotation speed. The first fluctuation amount is a fluctuation amount in the rotation speed between rotation speeds in cylinders in which the same stroke successively occurs. The second fluctuation amount is a fluctuation amount between rotation speeds at positions a predetermined crank angle period after the cylinders in which the same stroke successively occurs. The predetermined crank angle period is, for example, 720 crank angle degrees.

The misfire determination unit 14 calculates, as the fluctuation index ΔOMG, a difference between the first fluctuation amount and the second fluctuation amount. If the difference between the first fluctuation amount and the second fluctuation amount is within the predetermined misfire determination range, the misfire determination unit 14 determines the presence of a misfire.

The first fluctuation amount or the second fluctuation amount increases also when, for example, the engine rotation accelerates or decelerates in accordance with a control. In this embodiment, the misfire determination unit 14 calculates the difference between the first fluctuation amount and the second fluctuation amount, to determine a change in the rotation speed fluctuation amount after elapse of a 720 crank angle period. Accordingly, acceleration or deceleration of the engine rotation in accordance with a control is less influential. Since a change in the rotation speed fluctuation amount after elapse of the 720 crank angle period is determined, a change between rotation speeds in the same stroke is determined. Accordingly, at which crank angle position the change is determined is less influential. This allows acceleration or deceleration in accordance with a control to be less influential to the misfire detection.

A rotation fluctuation attributable to a factor different from the misfire can include not only a rotation fluctuation attributable to the acceleration or deceleration mentioned above but also a rotation fluctuation attributable to deterioration of the transfer element 59. The transfer element 59 is a mechanism driven by the engine 20, and is a component part of the vehicle 50 equipped with the engine 20. Thus, a rotation fluctuation attributable to deterioration of the transfer element 59 is inherently different from a rotation fluctuation attributable to temporary environments such as rough road traveling.

[Periodic Fluctuation Detection Unit]

The periodic fluctuation detection unit 12 shown in FIG. 3 detects a periodic fluctuation that is contained in a rotation fluctuation of the engine 20 and that is repeated on a circulation cycle of the transfer element 59. The periodic fluctuation detection unit 12 detects a periodic fluctuation based on a rotation speed acquired by the rotation speed acquisition unit 11. To be specific, the periodic fluctuation detection unit 12 detects a periodic fluctuation based on a circulation cycle of the transfer element 59 and a rotation speed of the crankshaft 21 acquired by the rotation speed acquisition unit 11.

The periodic fluctuation detection unit 12 detects a periodic fluctuation that is repeated on a circulation cycle of the wrapping transmission element 59a, to detect an abnormal state of the wrapping transmission element 59a.

Figure 7B:
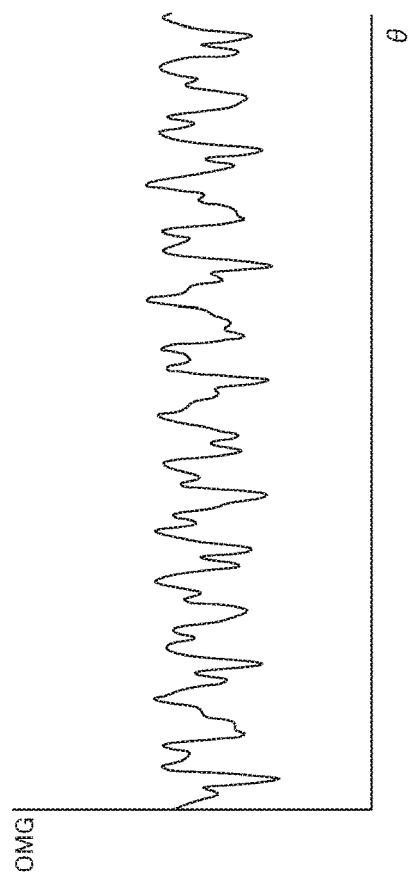
FIG. 7B is a graph showing an example of a measured rotation speed of the crankshaft in a case of using a deteriorated wrapping transmission element.
Figure 7A:
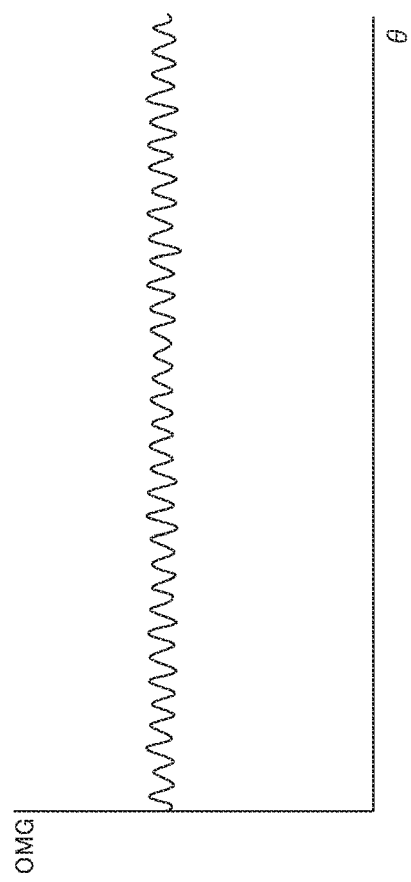
FIG. 7A is a graph showing an example of a measured rotation speed of the crankshaft.

FIG. 7A is a graph showing an example of a measured rotation speed of the crankshaft 21. In the graph of FIG. 7A, the horizontal axis represents the rotation angle θ of the crankshaft 21, and the vertical axis represents the rotation speed OMG. A rotation angle range shown in the graph of FIG. 7A is wider than that shown in the graph of FIG. 6. This is why a fluctuation in the rotation speed OMG is illustrated on a reduced scale as compared to the graph of FIG. 6.

Each graph of FIGS. 7A and 7B indicates a rotation speed obtained when the vehicle 50 equipped with the engine 20 travels. FIG. 7A shows a rotation speed fluctuation involved in the combustion operation of the engine 20.

FIG. 7B is a graph showing an example of a measured rotation speed of the crankshaft 21 in a case where a deteriorated wrapping transmission element is used as the wrapping transmission element 59a. The vertical axis and the horizontal axis in FIG. 7B are the same as the vertical axis and the horizontal axis in FIG. 7A, respectively. The vertical axis and the horizontal axis in FIG. 7B are on the same scales as the scales of the vertical axis and the horizontal axis in FIG. 7A, respectively.

Either of the graphs of FIG. 7A and FIG. 7B indicates a rotation speed in a case of no misfire in the engine 20 while not traveling on a rough road. The rotation speed indicated by the graph of FIG. 7B is influenced by the deteriorated wrapping transmission element 59a. The rotation speed obtained with use of the deteriorated wrapping transmission element 59a contains a fluctuation different from a rotation speed fluctuation obtained with use of the normal wrapping transmission element 59a having no deterioration.

The fluctuation different from the rotation speed fluctuation (FIG. 7A) with use of the normal wrapping transmission element 59a has a larger amplitude than the amplitude of the fluctuation involved in the combustion operation of the engine 20 shown in FIG. 7A. The fluctuation different from the rotation speed fluctuation obtained with use of the normal wrapping transmission element 59a is repeated on a predetermined circulation cycle.

FIG. 8 is a graph showing, on an enlarged scale, a rotation speed fluctuation of the crankshaft 21 in a case of using the deteriorated wrapping transmission element 59a. The graph of FIG. 8 corresponds to magnification of a part of FIG. 7B.

A rotation speed OMG shown in FIG. 8 contains a periodic fluctuation that is repeated on a circulation cycle of the transfer element 59 (see FIG. 1). In an example shown in FIG. 8, the rotation speed OMG contains a periodic fluctuation that is repeated on a circulation cycle of the wrapping transmission element 59a.

The graph of FIG. 8 indicates a circulation cycle Pc of the wrapping transmission element 59a. To facilitate understanding of repetition of the fluctuation on the circulation cycle Pc, the circulation cycle Pc is illustrated based on typical extreme values H each typifying a plurality of extreme values. The extreme value H is a local maximum value H. The circulation cycle Pc is illustrated also based on extreme values L which are different from the extreme values H. The extreme value L is a local minimum value L. The extreme value H, L is one example of an extreme value included in the rotation speed OMG. The rotation speed OMG has extreme values other than the extreme values H, L. In FIG. 8, extreme values within one circulation cycle Pc are denoted by the reference sign pk, as an example.

The plurality of extreme values pk including the extreme values H, L are repeated on the circulation cycle Pc. To be specific, the extreme values pk in one circulation cycle Pc are different from those in another circulation cycle Pc. Not all of the extreme values are repeated on the circulation cycle Pc. Specifically, the rotation speed OMG tends to repeat the plurality of extreme values pk on the circulation cycle Pc. In other words, the rotation speed OMG has a periodic fluctuation that is repeated on the circulation cycle Pc.

The periodic fluctuation that is repeated on the circulation cycle Pc shown in FIG. 8 is attributable to deterioration of the transfer element 59 (see FIG. 1).

The periodic fluctuation detection unit 12 shown in FIG. 3 detects a periodic fluctuation that is repeated on the circulation cycle Pc (see FIG. 8) of the wrapping transmission element 59a.

The periodic fluctuation detection unit 12 executes computation by using one rotation speed of the crankshaft 21 acquired by the rotation speed acquisition unit 11 and another rotation speed of the crankshaft 21 acquired by the rotation speed acquisition unit 11 a certain period before acquisition of the one rotation speed, the certain period having a length corresponding to a positive integer multiple of the circulation cycle Pc. In this way, the periodic fluctuation detection unit 12 detects a periodic fluctuation that is repeated on the circulation cycle Pc. Thus, the periodic fluctuation detection unit 12 detects an abnormal state of the wrapping transmission element 59a serving as the transfer element 59.

The periodic fluctuation detection unit 12 detects a periodic fluctuation at least when the amplitude of a periodic fluctuation that is repeated on the circulation cycle of the transfer element 59 is larger than the amplitude of a fluctuation involved in the combustion operation of the engine 20.

In detail, the periodic fluctuation detection unit 12 executes such computation that a value resulting from the computation increases as the correlation among periodic fluctuations repeated on the circulation cycle Pc is higher. In addition, the periodic fluctuation detection unit 12 executes such computation that a value resulting from the computation increases as the amplitude of a periodic fluctuation is larger.

In detail, the periodic fluctuation detection unit 12 calculates an autocorrelation function on the rotation speed OMG with a detection period being a positive integer multiple of the circulation cycle Pc. In more detail, the periodic fluctuation detection unit 12 computes the product of a rotation speed acquired by using the crank angle as a reference of an acquisition timing and a rotation speed value at a point delayed by the circulation cycle Pc.

If the product obtained by the computation is greater than a predetermined determination value, the periodic fluctuation detection unit 12 determines that a rotation speed fluctuation attributable to deterioration of the wrapping transmission element 59a is contained. The determination value is predefined based on actual measurement or simulation.

The periodic fluctuation detection unit 12 executes such computation that a value resulting from the computation increases as the correlation among periodic fluctuations repeated on the circulation cycle Pc is higher and that a value resulting from the computation increases as the amplitude of a periodic fluctuation is larger. By adjusting the determination value, therefore, a rotation speed fluctuation that influences a misfire determination is detected with a high accuracy.

In this embodiment, the rotation speed acquisition unit 11 acquires a rotation speed of the crankshaft 21 (rotator) based not on time but on the crank angle as a reference of an acquisition timing. That is, the rotation speed acquisition unit 11 acquires a rotation speed of the crankshaft 21 (rotator) every predetermined crank angle, instead of every predetermined time. The periodic fluctuation detection unit 12 detects a periodic fluctuation that is repeated on the circulation cycle Pc of the transfer element 59, based on the rotation speed that the rotation speed acquisition unit has acquired based on the crank angle as a reference. More specifically, the circulation cycle Pc is determined based on the rotation speed of the crankshaft 21 and a gear ratio of the transmission 58.

A rotation speed fluctuation caused by the wrapping transmission element 59a is a fluctuation attributable to a factor external to the engine. When seen on the time axis, however, a period of the fluctuation caused by the wrapping transmission element 59a dynamically changes in accordance with a fluctuation in the engine rotation speed. This is why it is difficult to detect a rotation speed fluctuation attributable to the wrapping transmission element 59a based on a rotation speed that is acquired by using a certain fixed time as a reference.

In this embodiment, a rotation speed fluctuation caused by the wrapping transmission element 59a which is a factor external to the engine is detected by using a rotation speed that is acquired based on the crank angle as a reference. This allows a fluctuation in the engine rotation speed to be less influential to the detection. Accordingly, a rotation speed fluctuation attributable to deterioration of the wrapping transmission element 59a is detected with a high accuracy.

A rotation speed fluctuation caused by meshing between the wrapping transmission element 59a and the transmission wheels 59b is not an undulation of the rotation speed but a relatively sharp fluctuation. The periodic fluctuation detection unit 12 detects a rotation speed fluctuation caused by this meshing, and therefore a rotation speed fluctuation attributable to deterioration of the wrapping transmission element 59a is detected with a high accuracy.

[Periodic Fluctuation Announcing Unit]

The periodic fluctuation announcing unit (information output unit) 13 outputs to the display device 30 fluctuation detection information indicating a periodic fluctuation detection result obtained by the periodic fluctuation detection unit 12. The detection of the periodic fluctuation is announced accordingly.

The display device 30 is, for example, a lamp as mentioned above. The display device 30 may serve as both a periodic fluctuation detection result display and a misfire display. The display device 30 may be, for example, a diagnosis device which is configured to get connected to the control device 10 for inspection/repair of the vehicle 50 as mentioned above. While the vehicle 50 is being driven, the periodic fluctuation announcing unit 13 stores in the memory 102 information indicating a determination result obtained by the periodic fluctuation detection unit 12. When a diagnosis device serving as the display device 30 gets connected to the control device 10, the periodic fluctuation announcing unit 13 outputs the information stored in the memory 102. As a result, the diagnosis device serving as the display device 30 displays the detection result obtained by the periodic fluctuation detection unit 12. In this case, the display device 30 displays a history of the detection result.

For example, a determination result obtained by the misfire determination unit 14 and a periodic fluctuation detection result are indicated on the display device 30.

The periodic fluctuation announcing unit 13 outputs the fluctuation detection information as information indicating the validity of a determination result about the presence or absence of a misfire obtained by the misfire determination unit 14. A display on the display device 30 based on the fluctuation detection information indicates that the validity of a misfire determination is low. In addition, based on a periodic fluctuation detection performed by the periodic fluctuation detection unit 12, the periodic fluctuation announcing unit 13 outputs the fluctuation detection information as information indicating an abnormal state of the wrapping transmission element 59a. A display on the display device 30 based on the fluctuation detection information indicates that the wrapping transmission element 59a is in an abnormal state.

In this embodiment, the misfire determination unit 14 determines an engine misfire based on a rotation speed of the crankshaft 21.

If a fluctuation as shown in FIG. 7B is contained in the rotation speed, the accuracy of the misfire determination unit 14 determining the presence or absence of a misfire is lowered. That is, the validity of a misfire determination is lowered.

Deterioration of the wrapping transmission element 59a is related to the performance of a mechanism driven by the engine 20. Therefore, a rotation speed fluctuation caused by deterioration of the wrapping transmission element 59a constantly influences the accuracy of a misfire detection, unlike a temporary fluctuation caused when, for example, the vehicle travels on a rough road. Thus, there is a risk that the accuracy of the determination performed by the misfire determination unit 14 may be constantly lowered. The accuracy of the misfire determination is restored by renewal of the wrapping transmission element 59a. The wrapping transmission element 59a is a component part associated with the engine 20. As a condition for detecting a misfire in the engine 20, a state of the wrapping transmission element 59a is inherently different from environments such as rough road traveling.

In this embodiment, when the accuracy of the misfire determination performed by the misfire determination unit 14 is lowered due to deterioration of the wrapping transmission element 59a, the deterioration of the wrapping transmission element 59a is detected.

This provides clear distinction between a case where a misfire is actually not occurring and a case where the misfire determination unit 14 is incapable of detection, under a situation where no misfire is detected, for example. That is, a case where a misfire determination result is valid is clear. Accordingly, a determination result obtained by the misfire determination unit 14 has an enhanced reliability.

The periodic fluctuation announcing unit 13 outputs information indicating a detection result obtained by the periodic fluctuation detection unit 12, to the outside of the control device 10. Thus, in a situation where a determination result obtained by the misfire determination unit 14 is used outside the control device 10, a case where the result can be used as it is and a case where the result cannot be used as it is are clear. That is, a case where a misfire detection result which is used outside the control device 10 is valid is clear.

In this embodiment, as described above with reference to the flowchart of FIG. 4, if the periodic fluctuation detection unit 12 detects a periodic fluctuation that is repeated on the circulation cycle of the wrapping transmission element 59a (FIG. 4, S14: Yes), a determination of the presence or absence of a misfire (FIG. 4, S19) and an output of a determination result (FIG. 4, S21) are stopped. That is, a determination of the presence or absence of a misfire is stopped for a period in which the engine 20 is in operation. Thus, in a situation where an erroneous determination can occur in a misfire determination due to a periodic fluctuation, an erroneous determination result is prevented from being outputted. An output content of a misfire determination result has an enhanced reliability.

In this embodiment, the misfire determination unit 14 determines rough road traveling. This embodiment clarifies a cause of lowering the accuracy of the misfire determination. To be specific, whether the accuracy of the misfire determination is lowered due to temporary environments such as rough road traveling or the accuracy of the misfire determination is lowered due to a function closely associated with the engine 20 is clearly distinguished.

The periodic fluctuation announcing unit 13 outputs detection information as information indicating an abnormality of the wrapping transmission element 59a, based on a periodic fluctuation detection performed by the periodic fluctuation detection unit 12. This facilitates repair or renewal of the wrapping transmission element 59a by a repair work or a maintenance work. The repair or renewal of the wrapping transmission element 59a results in a reduction of a periodic fluctuation that is repeated on a circulation cycle of the wrapping transmission element 59a. Consequently, a determination performed by the misfire determination unit 14 has an enhanced reliability.

In the embodiment described above, a control device for a three-cylinder engine is illustrated as an example of the misfire detection device. The misfire detection device of the present teaching is not limited to this, and it may be a misfire detection device for a single-cylinder engine. In a case of a single-cylinder engine, the "cylinders in which the same stroke successively occurs" mean the same cylinder.

In the embodiment described above, a periodic fluctuation detection unit that detects a fluctuation repeated on a circulation cycle of a wrapping transmission element is illustrated as an example of the periodic fluctuation detection unit. The periodic fluctuation detection unit included in the misfire detection device of the present teaching is not limited to this, and it may detect a fluctuation that is repeated on a circulation cycle of a plurality of transmission wheels around which the wrapping transmission element is wrapped. A periodic fluctuation attributable to wear of the transmission wheel is detected.

The periodic fluctuation detection unit included in the misfire detection device of the present teaching may detect a fluctuation that is repeated on a circulation cycle of each of the wrapping transmission element and the transmission wheel. A periodic fluctuation attributable to wear of each of the wrapping transmission element and the transmission wheel is detected.

It should be understood that the terms and expressions used in the above embodiments are for descriptions and not to be construed in a limited manner, do not eliminate any equivalents of features shown and mentioned herein, and allow various modifications falling within the claimed scope of the present teaching. The present teaching may be embodied in many different forms. The present disclosure is to be considered as providing embodiments of the principles of the teaching. The embodiments are described herein with the understanding that such embodiments are not intended to limit the teaching to preferred embodiments described herein and/or illustrated herein. The embodiments described herein are not limiting. The present teaching includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to embodiments described in the present specification or during the prosecution of the present application. The present teaching is to be interpreted broadly based on the language employed in the claims.

REFERENCE SIGNS LIST

10 control device (misfire detection device)
11 rotation speed acquisition unit
14 misfire determination unit
12 periodic fluctuation detection unit
13 periodic fluctuation announcing unit (information output unit)
20 engine
21 crankshaft (rotator)
50 vehicle
59 transfer element
59a wrapping transmission element
59b plurality of transmission wheels

What is claimed is:

1. A misfire detection device for detecting a misfire in a four-stroke engine that drives a wrapping transmission element wrapped around a plurality of transmission wheels so as to move circularly, the misfire detection device comprising a processor configured to execute a control program to implement:
   a rotation speed acquisition unit configured to acquire a rotation speed of a rotator rotated by the four-stroke engine;
   a misfire determination unit configured to determine a presence or absence of a misfire in the four-stroke engine based on the rotation speed of the rotator acquired by the rotation speed acquisition unit; and
   a periodic fluctuation detection unit configured to detect a periodic fluctuation contained in a rotation fluctuation of the four-stroke engine based on the rotation speed acquired by the rotation speed acquisition unit, the periodic fluctuation being repeated on a circulation cycle of at least one element of the wrapping transmission element or the plurality of transmission wheels, the periodic fluctuation having a plurality of extreme values within the circulation cycle of the one element; wherein
   the periodic fluctuation detection unit is configured to detect the periodic fluctuation in the rotation speed when the rotation speed contains a fluctuation caused by at least one element of the wrapping transmission element or the plurality of transmission wheels.

2. The misfire detection device according to claim 1, further comprising an information output unit configured to output, to outside of the misfire detection device, detection information indicating a detection result about the periodic fluctuation obtained by the periodic fluctuation detection unit.

3. The misfire detection device according to claim 2, wherein
the information output unit outputs the detection information as information indicating an abnormality of the at least one element, based on detection of the periodic fluctuation performed by the periodic fluctuation detection unit.

4. The misfire detection device according to claim 1, wherein
the misfire determination unit stops determining the presence or absence of the misfire in the four-stroke engine for at least part of a period in which the four-stroke engine is in operation, based on detection of the periodic fluctuation performed by the periodic fluctuation detection unit.

5. The misfire detection device according to claim 1, wherein
the periodic fluctuation detection unit detects the periodic fluctuation based on a circulation cycle of the at least one element and a rotation speed of the rotator acquired by the rotation speed acquisition unit.

6. The misfire detection device according to claim 5, wherein
the periodic fluctuation detection unit detects the periodic fluctuation by executing computation using one rotation speed of the rotator acquired by the rotation speed acquisition unit and another rotation speed of the rotator acquired by the rotation speed acquisition unit a certain period before acquisition of the one rotation speed, the certain period having a length corresponding to a positive integer multiple of the circulation cycle.

7. The misfire detection device according to claim 1, wherein
the wrapping transmission element is configured to mesh with the plurality of transmission wheels.

8. The misfire detection device according to claim 7, wherein
the plurality of extreme values occur in a fluctuation in the rotation speed of the four-stroke engine, and are caused by meshing between the wrapping transmission element and any of the plurality of transmission wheels.

9. A vehicle comprising:
a plurality of transmission wheels;
a wrapping transmission element wrapped around the plurality of transmission wheels so as to move circularly;
a four-stroke engine that drives the wrapping transmission element; and
a rotator that is rotated by the four-stroke engine,
the vehicle further comprising the misfire detection device according to claim 1.

* * * * *